United States Patent
Thomas et al.

[19]

[11] Patent Number: 6,087,812
[45] Date of Patent: Jul. 11, 2000

[54] INDEPENDENT DUAL-SWITCH SYSTEM FOR EXTENDING BATTERY LIFE UNDER TRANSIENT LOADS

[75] Inventors: George Thomas, Lawrenceville, Ga.; Jose' M. Fernandez, Sunrise, Fla.; Scott M. Garrett, Lawrenceville, Ga.; Georgina More', Lakeland, Fla.

[73] Assignee: Motorola, Inc., Schaumburg, Ill.

[21] Appl. No.: 08/874,811

[22] Filed: Jun. 13, 1997

[51] Int. Cl.[7] .................................................. H01M 10/46
[52] U.S. Cl. ............................................ 320/141; 320/166
[58] Field of Search .................................. 320/103, 118, 320/128, 129, 139, 141, 158, 166, FOR 104, FOR 112, FOR 120, FOR 138

[56] References Cited

U.S. PATENT DOCUMENTS

| | | | |
|---|---|---|---|
| 3,288,641 | 11/1966 | Rightmire | 136/6 |
| 3,423,642 | 1/1969 | Plehal et al. | 317/231 |
| 3,538,394 | 11/1970 | Bourgault et al. | 317/230 |
| 4,236,107 | 11/1980 | Templin | 320/140 |
| 4,612,492 | 9/1986 | Burk | 320/103 |
| 4,830,938 | 5/1989 | McCullough et al. | 429/149 |
| 4,900,643 | 2/1990 | Eskra et al. | 429/241 |
| 4,992,340 | 2/1991 | Tidwell et al. | 429/7 |
| 5,147,739 | 9/1992 | Beard | 429/194 |
| 5,204,608 | 4/1993 | Koenck | |
| 5,358,798 | 10/1994 | Kleinert et al. | 429/7 |
| 5,407,444 | 4/1995 | Kroll | 320/103 X |
| 5,421,745 | 6/1995 | Aksoy et al. | 439/626 |
| 5,439,756 | 8/1995 | Anani et al. | 429/9 |

FOREIGN PATENT DOCUMENTS

| | | |
|---|---|---|
| 843035 | 8/1979 | Germany . |
| 59-14681 | 1/1984 | Japan . |

*Primary Examiner*—Edward H. Tso
*Attorney, Agent, or Firm*—Felipe J. Farley; Philip Burrus

[57] ABSTRACT

A hybrid energy storage system (10) including a first energy storage device (12), such as a secondary or rechargeable battery, and a second energy storage device (14), such as an electrochemical capacitor, fuel cell, or flywheel. The second energy storage device provides intermittent energy bursts to satisfy the power requires of, for example, pulsed power communication devices. The first and second energy storage devices are coupled to a current controller to assure that pulse transients are not applied to the first energy storage device as a result of charging the second energy storage device.

5 Claims, 1 Drawing Sheet

INDEPENDENT DUAL-SWITCH SYSTEM FOR EXTENDING BATTERY LIFE UNDER TRANSIENT LOADS

CROSS REFERENCE TO RELATED APPLICATIONS

This application is related to pending U.S. application Ser. No. 08/755,620, filed Nov. 25, 1996, by Thomas, et al, entitled "ENERGY STORAGE SYSTEM," and assigned to Motorola, Inc.

TECHNICAL FIELD

This invention relates in general to energy storage devices, and in particular to hybrid rechargeable energy storage devices which provide high power and high capacity for portable electronic devices.

BACKGROUND OF THE INVENTION

Consumer markets continue to request smaller, portable electronic devices having more functional features. Examples of such devices include two-way and broadcast radio receivers, compact disc players, cellular telephones, and computer devices, to name but a few. As portable electronic devices have become smaller, the demand for smaller energy sources, including batteries, has increased. While very small energy storage devices, such as an electrochemical battery cells may be fabricated for a given electrical device; compactness comes at the cost of energy capacity. Accordingly, for many high power applications the energy source is too bulky, too heavy, or doesn't last long enough.

As the energy storage device, such as a battery, is discharged, it becomes unable to provide current at a required level. Thus, even though the battery may retain a substantial charge, it is useless to the device to which it is attached. This problem is exacerbated when the device to which the battery is attached requires high power (i.e., current pulses) in an operating cycle which otherwise requires a much lower operating current. Such is the case with portable communications devices, such as digital two-way radios and cellular phones when in the transmit mode. These power pulses or spikes require significantly higher current outputs than when the device is receiving or in standby mode.

As the physical size of batteries decreases (to meet size requirements of product designers), the capacity of the battery is reduced. This results in device users needing many batteries if they anticipate being away from a battery charging device for extended periods of time. Alternatively, users may carry portable, high speed, charging devices with them. This however is unacceptable, due to the additional weight associated with the charging device.

Prior art attempts to address the high power spikes entailed providing electrolytic capacitors in the application device. This had the disadvantage of increasing substantially the size of the application device, as electrolytic capacitors are typically very large, cylindrical devices. Other attempts are described in U.S. Pat. No. 5,439,756 to Anani, et al, in which an electrical energy storage device is provided. The device disclosed in the '756 patent includes a battery electrode, a capacitor electrode, and a third electrode as the counter electrode for both the battery and the capacitor electrodes. The device also includes electronics to switch the third electrode between the battery electrode and the capacitor electrode. A second solution to this problem is provided in the aforementioned '517 application which describes a power source having a first component, for example, a battery, for delivering a substantially constant output, and a second component, a capacitor for example, which delivers power in response to the power pulses and spikes required by the application device. The capacitor can then be recharged by the battery, assuming the duty cycle permits. While this type of power source addresses the needs of pulsed power application devices, it does not address the fact that changing conditions may require a different trigger point at which the second component is activated. These conditions may be environmental, such as low temperature, or a function of the age of the first power source. Failure to recognize the effect of changed condition may also have the deleterious effect of shrinking the life of the power source. However, recharging the capacitor via the battery has the deleterious effect of imposing a power spike on the battery at the start of the capacitor recharge cycle. While this spike is not as large as that demanded by an application device, the effect on the battery, over time, can be as great. More particularly, the battery recharges the capacitor between pulses via a constant voltage mode charge. However, this mode can result in incomplete charging of the capacitor because as the voltage difference between the battery and the capacitor narrows, the current flow from the battery reduces, thus requiring a very long time to fully charge the capacitor. Thus, recharging in that mode can result in the capacitor being less than fully charged.

Accordingly, what is needed is an energy source which is capable of providing sufficient voltage for the high power pulses required of certain devices, while extending the usable life of the energy source. The device should also include means by which current drain from the battery is as smooth and uniform as possible to extend battery life. Such a device should be relatively small, and capable of being easily sized and shaped for a given application. Moreover, such a device should include a mechanism to control and/or manage recharging of the capacitor to assess a full recharge.

DETAILED DESCRIPTION OF THE PREFERRED EMBODIMENT

Figure 1:
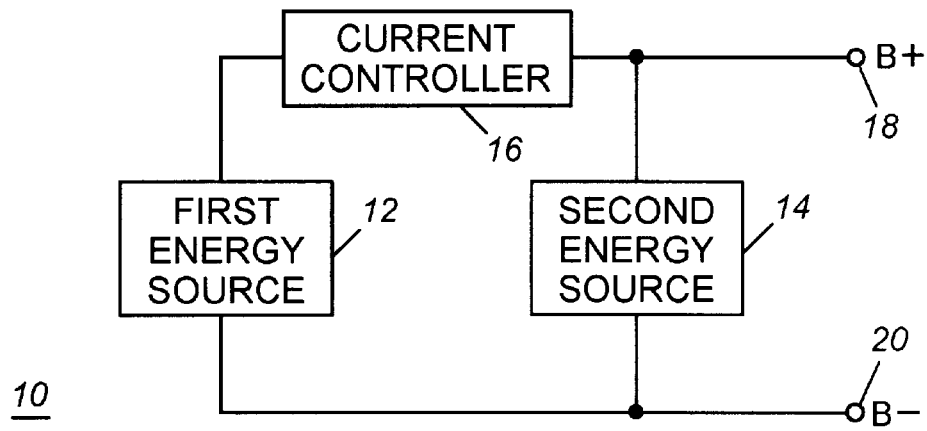
FIG. 1 is a block diagram of an energy storage device in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a block diagram of an energy storage device 10 in accordance with the present invention. The device 10 includes a first energy source 12 having a high energy density, a high capacity, and is capable of substantially constant current output, but which may not be able to provide high power as required by certain applications. The first energy source 12 may thus be one or more conventional battery cells, examples of which include, but are not limited to, a lead-acid battery, a nickel-cadmium battery, a nickel-metal hydride battery, a lithium ion battery, a lithium polymer battery, a lithium ion polymer electrolyte battery, a zinc air battery, and combinations thereof. The battery cell or cells may also be a primary battery, such as a conventional alkaline battery. The battery cell or cells are disposed in a battery pack (not shown).

The diagram 10 also shows that connected electrically in parallel with the first energy source 12, is a second energy source 14. The second energy source is capable of delivering a burst of high power, as may be required by a particular application. As such, the second energy source 14 is preferably an electrochemical capacitor, but can also include other types of capacitors, fuel cells, flywheels or any other power source capable of delivering a burst of high power. For convenience, the second energy source 14 is hereafter referred to as an electrochemical capacitor, although, as mentioned, other devices may alternatively be employed in accordance with the present invention. The electrochemical capacitor device typically includes at least one electrode fabricated of a metal oxide material such as $RuO_2$. The second electrode may also be a similar or different metal oxide, or may be of another type of material altogether. In this regard, the second electrode may be a polymer such as polyanile, polypyrrole, polyurethane, polyacrylamide and combinations thereof. One or both of the electrodes may be alternatively fabricated of a carbon based material. The electrolyte may be alkaline or proton conducting and/or organic solvent based.

In one embodiment, the capacitor is a thin device including a first electrode, a second electrode, and an electrolyte disposed therebetween. In a preferred embodiment, the capacitor may be fabricated as disclosed in one or more of U.S. patent application Ser. Nos. 08/415,976 to Bai, et al, entitled "Electrochemical Capacitor and Method of Making Same"; U.S. Ser. No. 08/414,816 to Bai, et al entitled "Electrochemical Charge Storage Device Having Constant Voltage Discharge"; U.S. Ser. No. 08/513,648 to Bai, et al, entitled Electrochemical Cell Having Solid Polymer Electrolyte and Asymmetrical Inorganic Electrodes; U.S. Ser. No. 08/340,957 to Howard, et al., entitled "Polymer Gel Electrolyte and Electrochemical Capacitor Device Using Same"; U.S. Ser. No. 08/505,427 to Howard, entitled "Conducting Polymer Electrodes for Energy Storage Devices and Method of Making Same"; U.S. Ser. No. 08/358,294 to Li, et al, entitled "Electrode Material and Electrochemical Devices Using Same"; U.S. Ser. No. 08/396,991 to Li, et al., entitled "Modified Electrolyte for Electrochemical Cells"; U.S. Ser. No. 08/498,450 to Li, et al., entitled "Polymer Electrodes for Energy Storage Devices and Method of Making Same"; U.S. Ser. No. 08/297,074 to Lian, et al., entitled "Amorphous Cobalt Alloy Electrodes for Aqueous Electrochemical Devices"; and U.S. Pat. No. 5,429,895 to Lian, et al., entitled "Nickel Alloy Electrodes for Electrochemical Devices," the disclosures of which are incorporated herein by reference.

Electrically connected to the first and second energy sources is current controller 16 adapted to condition the current output of the first and second energy sources.

As noted above, the problems occasioned by high power spikes or peaks are most frequently observed in devices requiring brief, intermittent high power levels. Pulsed power communication devices such as digital cellular phones, two-way radios, and talk-back pagers all make such demands of their associated energy sources. Thus, a load is connected at contacts 18 and 20, and is a device which requires high power spikes, such as those applications described above. Other examples include power tools, which require a burst of power to, for example, start turning a drill bit, or a personal computer to start the disc drive or the display backlight. The pulses in these devices are more transient, and are not the uniform, repeating pulses experienced in digital communication.

In order to preserve and extend battery life for the battery cell 12, it is necessary to ensure a constant current output, or at least as smooth and uniform a constant current output as is possible from the battery cell. Repeated intermittent spikes and power drain from the battery causes build ups in internal impedance of the battery cell, resulting in a shortened battery life and degraded battery performance. While major spikes have been eliminated by placing the capacitor in parallel with the battery pack to address the power spike needs of the application devices, power spikes will still occur upon recharging of the capacitor by the battery. However, the current controller illustrated in FIG. 1 is designed to reduce or eliminate power spikes occasioned by the initiation of the recharge cycle of the capacitor.

Figure 2:
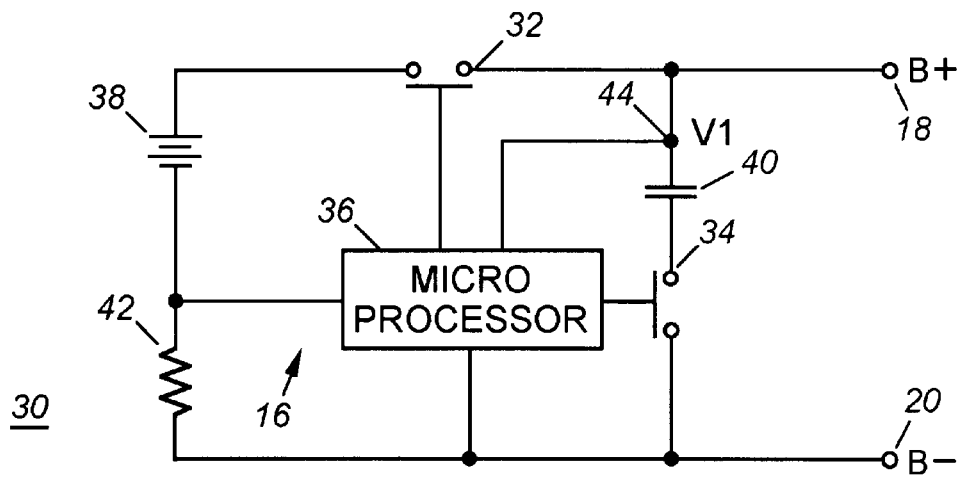
FIG. 2 is a circuit diagram of an energy storage device in accordance with the present invention.

Accordingly, and as is illustrated in FIG. 2, there is provided a circuit 30 in which the current controller 16 comprises a pair of switches 32 and 34 electrically coupled to a controller such as a microprocessor 36. The first switch 32 may be coupled between the battery 38 and contact 18. Similarly, switch 34 is disposed between the capacitor 40 and contact 20. The controller 36 is responsive to the power pulses described hereinabove, via measurement of power requirements at resistor 42 and node 44. In normal operation, i.e., when no power pulse is applied, switch 32 is closed and switch 34 is open thus allowing the battery 38 to supply a relatively constant current electrical charge to a load at contacts 18 and 20. However, when a power pulse is detected by the controller 36 via resistor 42 and node 44, the controller opens switch 32 and closes switch 34, thus coupling the capacitor 40 to contacts 18 and 20. With switch 32 open, the battery 38 is disconnected from the contacts 18,20. When the pulse is removed, the switch 32 is returned to the first condition and switch 32 then acts as a variable resistor. This connects the constant current regulator between the battery and the capacitor which will allow constant current of a set value to flow into the capacitor device for recharging the capacitor. The voltage of the capacitor may be used as a control parameter for terminating charge thereof. Alternatively, other control parameters such as load current, time, and battery pressure can also be used as controls. Each of these control parameters may be easily measured via the controller 36. The result of this configuration is that the battery 38 will operate in a constant current discharge mode regardless of whether or not the capacitor is being charged. It is understood that by operating a battery in a constant current discharge mode, one will significantly enhance the cycle life of the battery cell. It has the further advantage, in the instant embodiment, of assuring that the capacitor is fully recharged between current pulses, by assuring adequate current flow from the battery to the charger.

Figure 3:
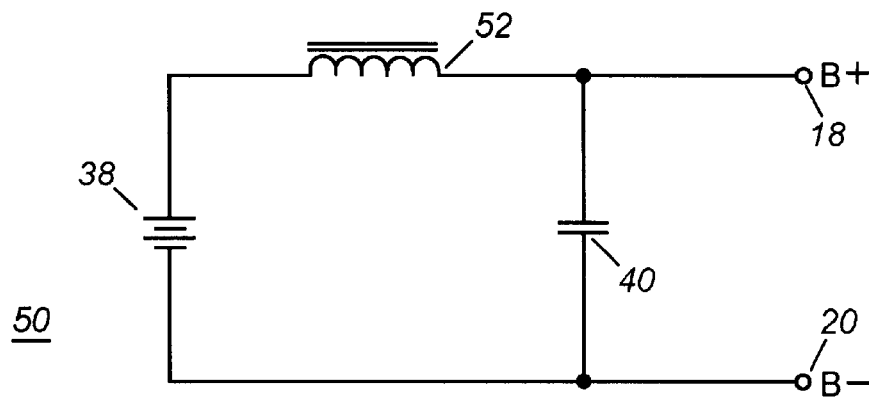
FIG. 3 is a circuit diagram of a second energy storage device in accordance with the present invention.

Referring now to FIG. 3, there is illustrated therein a second circuit diagram for a device in accordance with the instant invention. In the embodiment of FIG. 3, the device 50 includes an inductor 52 electrically coupled between the battery 38 and the capacitor 40. When a pulse is applied to the circuit of FIG. 3, more charge will be drawn from the capacitor 20 resulting in a more rapid linear drop of voltage. The size of the capacitor 20 can tend to pull the effect of the charge drain through the battery 38 without protective circuitry. The larger the capacitor 20, the less the slope of the voltage will be during the pulse. However, the voltage drop is more tolerable than failure of the battery 38 alone. Thus, the inductor 32 between the battery 38 and the capacitor 20 eliminates the severe transient current spike from being applied to the battery 38 spreading the current pulse over a greater period of time.

Essentially, the inductor 52 can be interposed between the battery 38 and the capacitor 20 to regulate the current from battery 38 to a desired level. When a pulse is applied at contacts 18 and 20, the capacitor 20 delivers the current since the inductor will not allow a current flow above a set value, say 300 milliampers (mA). When the pulse is removed, the capacitor will be charged from the energy stored in the inductor. This prevents the need for the battery to supply transient currents or current spikes to charge the capacitor. The inductor 52 will be selected in such a way that it has sufficient energy stored to charge the capacitor 20 in time for it to deliver the next pulse and is thus stated as a function of the frequency of said current pules. Current flow from battery charges the inductor 52 by storing the energy via the magnetic flux of the inductor and this energy is released later when the current flow through the inductor decreases. Thus, by eliminating the transient current discharges from the battery 38 by using the inductor 52, the life of the battery is further extended. Moreover, the resistive losses associated with high current spikes are also eliminated. This saved energy results in the increased use time between recharges of the battery in a pulse power application.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An energy storage system having a positive output and a return line for providing an electrical charge, including periodic current pulses, comprising:

at least one rechargeable battery cell having a positive and a negative terminal;

at least one capacitor coupled in parallel with said output;

a first independent switch means coupled in series between said positive terminal of said at least one rechargeable battery cell and said at least one energy storage device;

a second independent switch means coupled in series between said negative terminal of said at least one rechargeable battery cell and said return line of said energy storage system;

a current sense resistor coupled in series between said return line of said energy storage system and said at least one rechargeable battery cell; and a control circuit with at least two outputs and at least two inputs and a ground terminal, with a first output coupled to said first independent switch, a second output coupled to said second independent switch, a first input coupled to said positive output of said energy storage system, a second input coupled to the negative terminal of said at least one rechargeable battery cell, with said ground terminal coupled to said return line of said energy storage system;

wherein under normal conditions said control circuit closes said first independent switch and opens said second independent switch; and further wherein when said control circuit senses a periodic current pulse as a voltage pulse across said current sense resistor, said control circuit opens said first independent switch and closes said second independent switch.

2. A device as described in claim 1 wherein said first independent switch means comprises a Metal Oxide Field Effect Transistor.

3. A device as described in claim 1 wherein said second independent switch means comprises a Metal Oxide Field Effect Transistor.

4. A device as described in claim 1 wherein said first independent switch means comprises a bipolar junction transistor.

5. A device as described in claim 1 wherein said second independent switch means comprises a bipolar junction transistor.

* * * * *